(12) United States Patent
Lutke et al.

(10) Patent No.: US 8,783,625 B2
(45) Date of Patent: *Jul. 22, 2014

(54) PNEUMATIC CONTROL SYSTEM FOR AERODYNAMIC SURFACES

(75) Inventors: Kevin R. Lutke, Huntington Beach, CA (US); Aaron J. Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/267,614

(22) Filed: Oct. 6, 2011

(65) Prior Publication Data

US 2012/0104182 A1    May 3, 2012

Related U.S. Application Data

(62) Division of application No. 12/042,443, filed on Mar. 5, 2008, now Pat. No. 8,042,772.

(51) Int. Cl.
*B64C 3/44* (2006.01)

(52) U.S. Cl.
USPC .......................................................... 244/219

(58) Field of Classification Search
USPC ................. 244/35 R, 44, 198, 219, 123.11
See application file for complete search history.

(56) References Cited

U.S. PATENT DOCUMENTS

| | | | |
|---|---|---|---|
| 2,886,265 A | 5/1959 | Ritter et al. | |
| 2,979,287 A * | 4/1961 | Ross | 244/219 |
| 3,047,257 A * | 7/1962 | Chester | 244/226 |
| 3,184,187 A | 5/1965 | Isaac | |
| 3,473,761 A | 10/1969 | Chutter | |
| 3,711,039 A | 1/1973 | James | |
| 3,930,626 A | 1/1976 | Croswell, Jr. | |
| 3,957,232 A * | 5/1976 | Sebrell | 244/123.11 |
| 4,261,534 A * | 4/1981 | Roselli | 244/22 |
| 4,349,169 A | 9/1982 | McAnally | |
| 4,725,021 A | 2/1988 | Priddy | |
| 4,979,700 A | 12/1990 | Tiedeman et al. | |
| 5,005,783 A * | 4/1991 | Taylor | 244/97 |
| 5,181,678 A | 1/1993 | Windnall et al. | |
| 5,566,908 A | 10/1996 | Greenhalgh | |
| 5,662,294 A * | 9/1997 | Maclean et al. | 244/219 |
| 5,697,579 A | 12/1997 | Hayashi | |

(Continued)

OTHER PUBLICATIONS

USPTO Notice of allowance for U.S. Appl. No. 12/042,443 dated Jul. 1, 2011.

(Continued)

*Primary Examiner* — Tien Dinh
*Assistant Examiner* — Keith L Dixon
(74) *Attorney, Agent, or Firm* — Yee & Associates, P.C.

(57) ABSTRACT

A flight control system for an airfoil comprises a control surface, a chamber connecting the control surface to the airfoil, and a pneumatic mechanism fluidly connected to the chamber. The chamber may be comprised of at least two cells that may be fluidly separated by a membrane. The pneumatic mechanism is configured to provide differential pressure to the cells in order to alternately increase volume/pressure of the cells to cause deflection of the control surface. The cells may have a stretchable outer surface to allow for changes in the length of the outer surface in response to inflation/deflation of the cells. The outer surface of the cells may be substantially continuous with outer mold lines of the airfoil and of the control surface.

20 Claims, 8 Drawing Sheets

(56) References Cited

U.S. PATENT DOCUMENTS

| | | | |
|---|---|---|---|
| 6,015,115 A * | 1/2000 | Dorsett et al. | 244/219 |
| 6,082,667 A | 7/2000 | Haggard | |
| 6,138,956 A | 10/2000 | Monner | |
| 6,199,796 B1 * | 3/2001 | Reinhard et al. | 244/35 R |
| 6,260,797 B1 | 7/2001 | Palmer | |
| 6,264,136 B1 | 7/2001 | Weston | |
| 6,347,769 B1 * | 2/2002 | To et al. | 244/219 |
| 6,419,189 B1 | 7/2002 | DiChiara, Jr. et al. | |
| 6,431,100 B2 | 8/2002 | Abshier | |
| 6,536,712 B1 | 3/2003 | Barenett | |
| 6,568,631 B1 | 5/2003 | Hillsdon | |
| 6,568,640 B1 | 5/2003 | Barnett | |
| 6,648,272 B1 | 11/2003 | Kothmann | |
| 6,786,456 B2 | 9/2004 | Veal et al. | |
| 7,093,789 B2 | 8/2006 | Baroceloa et al. | |
| 7,137,592 B2 | 11/2006 | Baroceloa et al. | |
| 7,185,851 B2 | 3/2007 | Elam | |
| 7,306,187 B2 | 12/2007 | Lavan | |
| 7,424,988 B2 | 9/2008 | McDonnell | |
| 7,770,962 B1 | 8/2010 | Maxwell | |
| 7,777,165 B2 | 8/2010 | Sanderson et al. | |
| 7,866,601 B2 | 1/2011 | Balaskovic | |
| 7,963,485 B2 | 6/2011 | Koneczny | |
| 8,042,772 B2 * | 10/2011 | Lutke et al. | 244/219 |
| 8,104,713 B2 | 1/2012 | Sanderson et al. | |
| 8,393,576 B2 | 3/2013 | Lutke et al. | |
| 2001/0047745 A1 | 12/2001 | Abshier | |
| 2002/0003189 A1 | 1/2002 | Kuenkler | |
| 2003/0001044 A1 | 1/2003 | Munk | |
| 2003/0192985 A1 | 10/2003 | Lipeles | |
| 2004/0046085 A1 | 3/2004 | Veal et al. | |
| 2004/0195431 A1 | 10/2004 | Yumlu et al. | |
| 2005/0151007 A1 | 7/2005 | Cadogan et al. | |
| 2005/0191930 A1 | 9/2005 | Foster et al. | |
| 2005/0258305 A1 | 11/2005 | Piers et al. | |
| 2005/0258306 A1 | 11/2005 | Barocela et al. | |
| 2008/0179454 A1 | 7/2008 | Balaskovic | |
| 2009/0108135 A1 | 4/2009 | Shaw | |
| 2009/0206192 A1 | 8/2009 | Sanderson et al. | |
| 2009/0206196 A1 | 8/2009 | Parks et al. | |
| 2009/0224108 A1 | 9/2009 | Lutke | |
| 2010/0001128 A1 | 1/2010 | Morehead et al. | |
| 2010/0077693 A1 | 4/2010 | Cheynet de Beaupre | |
| 2010/0096493 A1 | 4/2010 | Khakimov et al. | |
| 2010/0237192 A1 | 9/2010 | Sanderson et al. | |
| 2011/0084174 A1 | 4/2011 | Hemmelgarn et al. | |
| 2011/0163200 A1 | 7/2011 | Balaskovic | |
| 2011/0168324 A1 | 7/2011 | Ender | |
| 2012/0018571 A1 | 1/2012 | Goelet | |
| 2012/0043416 A1 | 2/2012 | Morehead et al. | |
| 2012/0048990 A1 | 3/2012 | Sommer | |

OTHER PUBLICATIONS

ILC Dover LP, "Low Packing Volume Inflatable UAV Wing", <http://www.ilcdover.com/products/aerospace_defense/uavwings.htm> last visited on Feb. 7, 2008. Closest I Can Come: http://www.ilcdover.com/UAV-Wings/.

Cadogan et al., "Inflatable and Rigidizable Wings for Unmanned Aerial Vehicles", AIAA-2003-6630, available at https://imageserv5.team-logic.com/mediaLibrary/93/Recent_Development_and_Test_of_Inflatable_Wings1_1.pdf; last visited Aug. 24, 2011.

Cadogan et al., "Morphing Inflatable Wing Development for Compact Package Unmanned Aerial Vehicles", AIAA-2004-1807,https://imageserv5.team-logic.com/mediaLibrary/93/Morphing_Inflatable_Wing_Development_for_Compact_Package_Unmanned_Aerial_Vehicles.pdf; last visited Aug. 24, 2011.

Scarborough et al., "Development of a Finite Element Model of Warping INflatable Wings", available at https://imageserv5.team-logic.com/mediaLibrary/93/Development_of_a_Finite_Element_Model_of_Warping_Inflatable_Wings.pdf; last visited Aug. 24, 2011.

Jones et al., "A High-Altitude Test of Inflatable Wings for Low-Density Flight Applications", available at http://www.ilcdover.com/Engineered-Inflatables-Info/; last visited Aug. 24, 2011.

Cadogan et al., "Inflatable Composite Habitat Structures for Lunar and Mars Exploration", available at https://imageserv5.team-logic.com/mediaLibrary/93/Inflatable_Composite_Habitat_Structures_for_Lunar_and_Mars_Exploration.pdf; last visited Aug. 24, 2011.

Vertigo, Inc., "Inflatable Wings", <http://www.vertigo-inc.com/inflatable_wings/> last visited on Feb. 7, 2008. Note: Page No Longer Exists, Vertigo Acquired by Hunter Defense Technologies Apr. 1, 2009.

Wikipedia, definition of "Wing warping", http://en.wikipedia.org/wiki/Wing_warping; last visited Aug. 24, 2011.

USPTO Office action for U.S. Appl. No. 12/042,443 dated Nov. 10, 2010.

USPTO Final Office action for U.S. Appl. No. 12/042,443 dated Mar. 30, 2011.

Office Action, dated Oct. 16, 2012, regarding U.S. Appl. No. 12/633,212, 42 pages.

Notice of Allowance, dated Oct. 24, 2012, regarding U.S. Appl. No. 13/445,708, 21 pages.

USPTO Notice of Allowance dated Apr. 16, 2012 for U.S. Appl. No. 12/633,251, 16 pages.

USPTO Requirement for Restriction dated Mar. 2, 2012 for U.S. Appl. No. 12/633,251, 9 pages.

Amendment submitted with RCE dated Jun. 9, 2011 for U.S. Appl. No. 12/042,443, 16 pages.

Response to Final Office Action dated May 18, 2011 for U.S. Appl. No. 12/042,443, 16 pages.

Response to Office Action dated Feb. 8, 2011 for U.S. Appl. No. 12/042,443, 13 pages.

Cadogan et al., "Recent Development and Test of Inflatable Wings", ILC Dover, Inc., AIAA 2006-2139, 47th AIAA/ASME/ASCE/AHS/ASC Structures, Structural Dynamics and Materials Conference, May 2006.

Grant, "The Radar Game: Understanding Stealth and Aircraft Survivability", Copyright 1998, IRIS Independent Research, 59 pages.

Haight et al., "Hybrid Inflatable/Rigidizable Wings for High Altitude Applications", Adherent Technologies, Inc., AIAA 2009-2148, 50th AIAA/ASME/ASCE/AHS/ASC Structures, Structural Dynamics, and Materials Conference, May 2009, 14 pages.

Jacob et al., "Design Limitations of Deployable Wings for Small Low Altitude UAVs", American Institute of Aeronautics and Astronautics, AIAA 2009-745, 47th AIAA Aerospace Sciences Meeting Including the New Horizons Forum and Aerospace Exposition, Jan. 2009, 24 pages.

Jacob et al., "Design of HALE Aircraft Using Inflatable Wings", American Institute of Aeronautics and Astronautics, AIAA 2008-167, 48th AIAA Aerospace Sciences Meeting and Exhibit, Jan. 2008, 16 pages.

Norris et al., "Historical Perspective on Inflatable Wing Structures", American Institute of Aeronautics and Astronautics, AIAA 2009-2145, 50th AIAA/ASME/ASCE/AHS/ASC Structures, Structural Dynamics, and Materials Conference, May 2009, 10 pages.

Simpson et al., "Aeroelastic Deformation and Buckling of Inflatable Wings under Dynamic Loads", American Institute of Aeronautics and Astronautics, AIAA 2007-2239, 48th AIAA/ASME/ASCE/AHS/ASC Structures, Structural Dynamics, and Materials Conference, Apr. 2007, 22 pages.

Simpson et al., "Inflatable and Warpable Wings for Meso-scale UAVs", American Institute of Aeronautics and Astronautics, AIAA 2005-7161, AIAA Infotech@Aerospace, Sep. 2005, 13 pages.

Lutke et al., "Variable Pitch Airfoils", filed Dec. 8, 2009, U.S. Appl. No. 12/633,251, 45 pages.

Lutke et al., "Inflatable Fuselage", filed Dec. 8, 2009, U.S. Appl. No. 12/633,212, 45 pages.

Lutke et al., "Non-Reflective Wing", filed Dec. 8, 2009, U.S. Appl. No. 12/633,272, 52 pages.

Response to Restriction Requirement dated Mar. 15, 2012 for U.S. Appl. No. 12/633,251, 9 pages.

"Inflatable Wings," Vertigo Inc., dated on or before Mar. 5, 2008, 3 pages, accessed Oct. 19, 2009 http://www.vertigo-inc.com/inflatable_wings/.

(56) References Cited

OTHER PUBLICATIONS

Notice of Allowance dated Jul. 9, 2012 regarding U.S. Appl. No. 13/445,708, 10 pages.
Notice of Allowance dated Aug. 27, 2012 regarding U.S. Appl. No. 12/633,251, 17 pages.
"Inflatable Wings, Gun Launched Observation Vehicle," Vertigo, Inc., Jun. 2003, 2 Pages, last accessed Feb. 2008 http://web.archive.org/web/20041030234709/http://vertigo-inc.com/Aeronautical_Systems/Glov/Glov.html.
Non-final office action dated Feb. 13, 2013 regarding U.S. Appl. No. 12/633,272, 38 pages.
Final Office Action, dated May 21, 2013, regarding U.S. Appl. No. 12/633,212, 23 pages.
Final Office Action, dated Sep. 5, 2013, regarding U.S. Appl. No. 12/633,272, 23 pages.

* cited by examiner

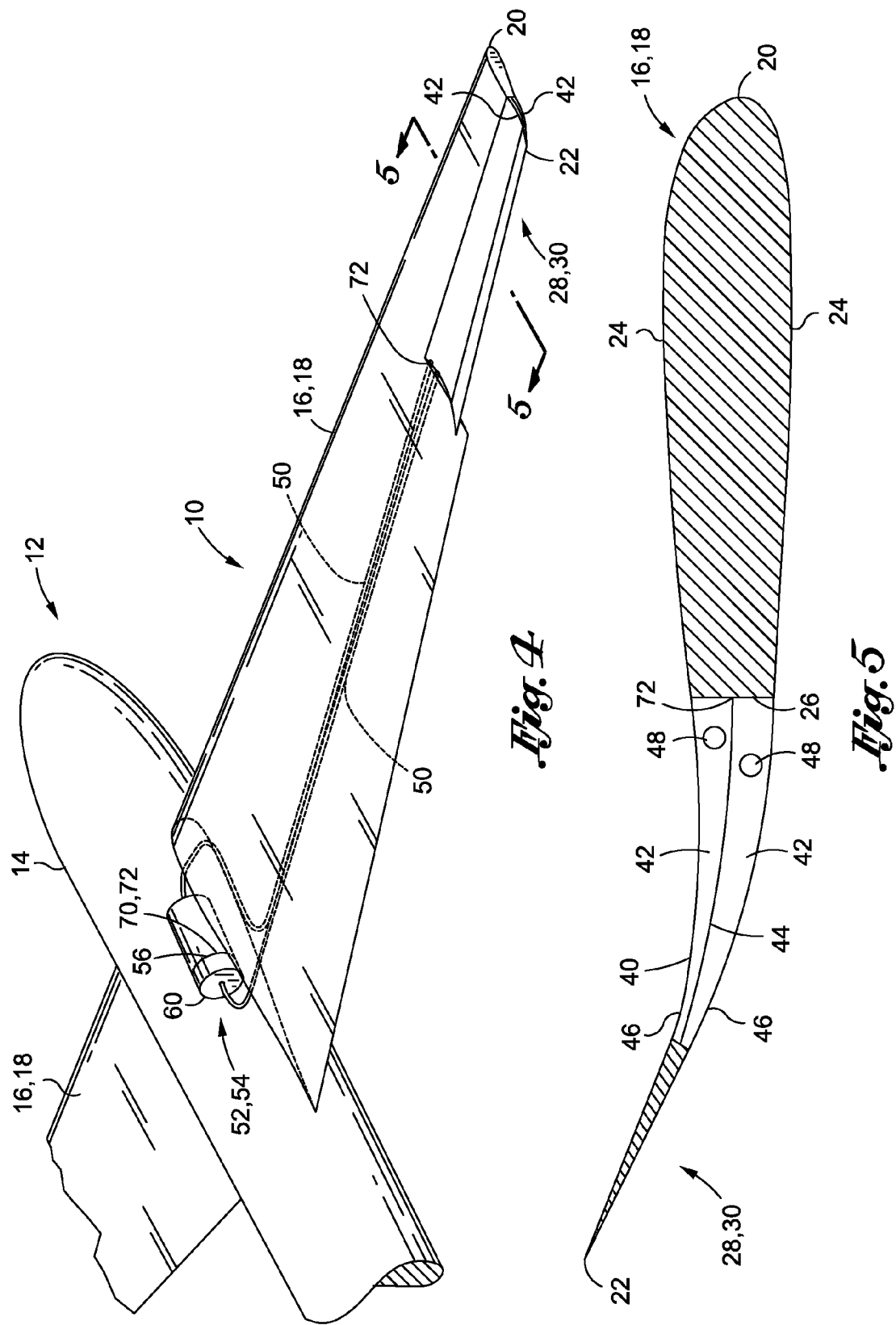

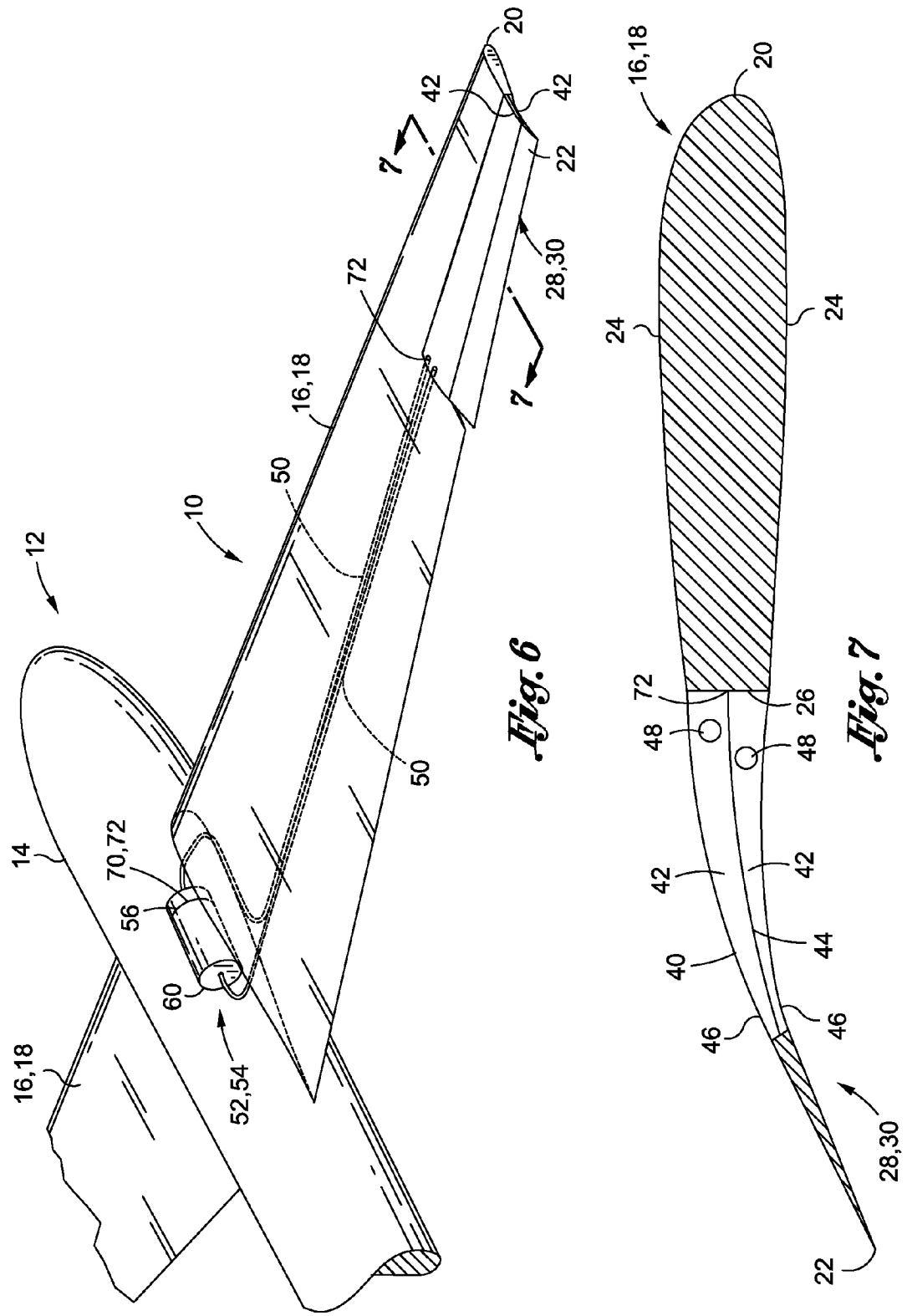

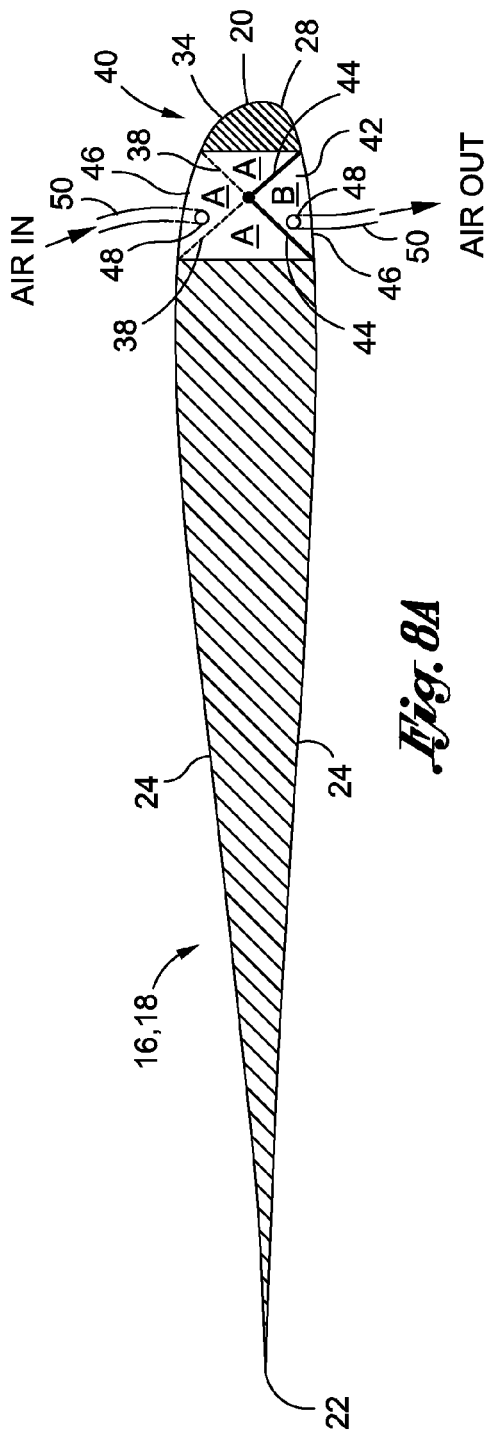
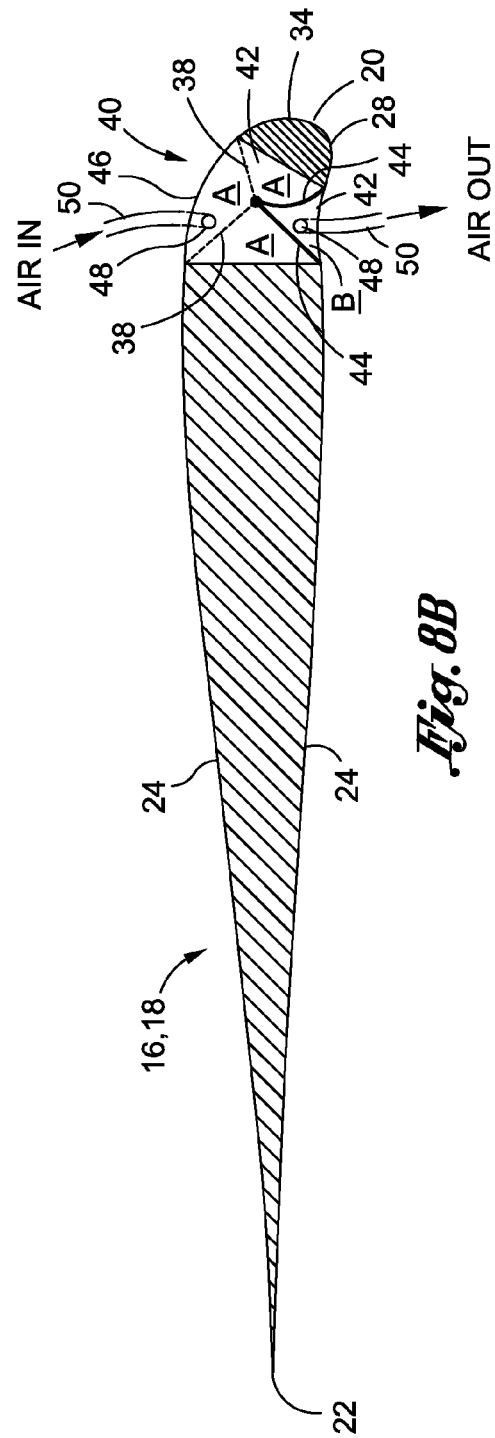

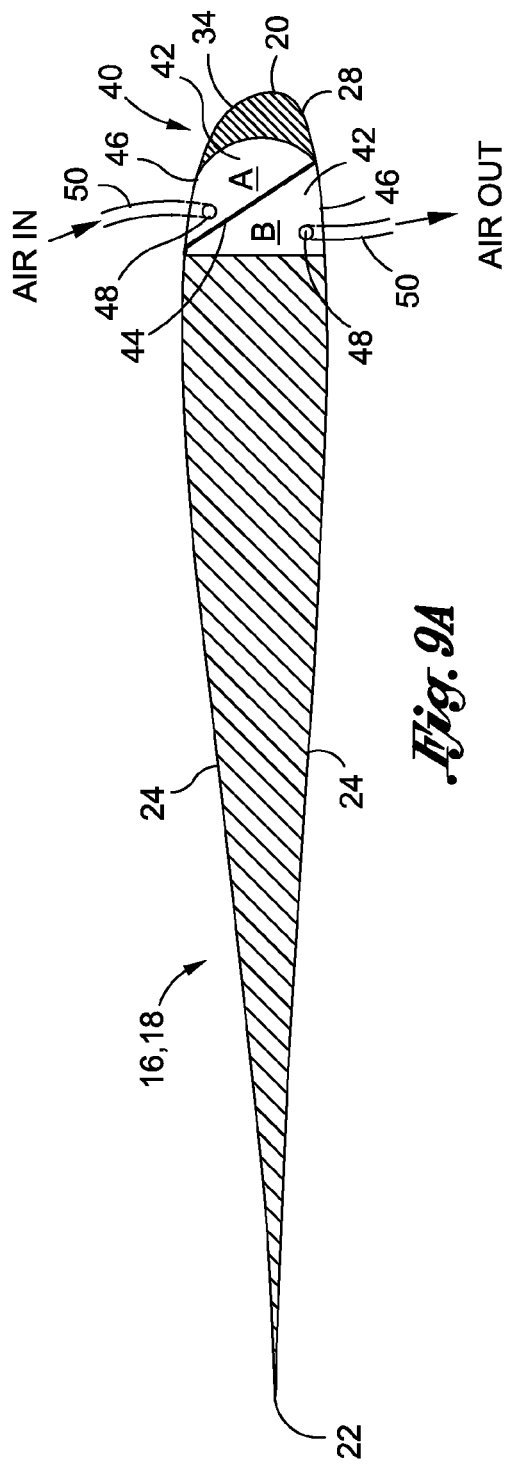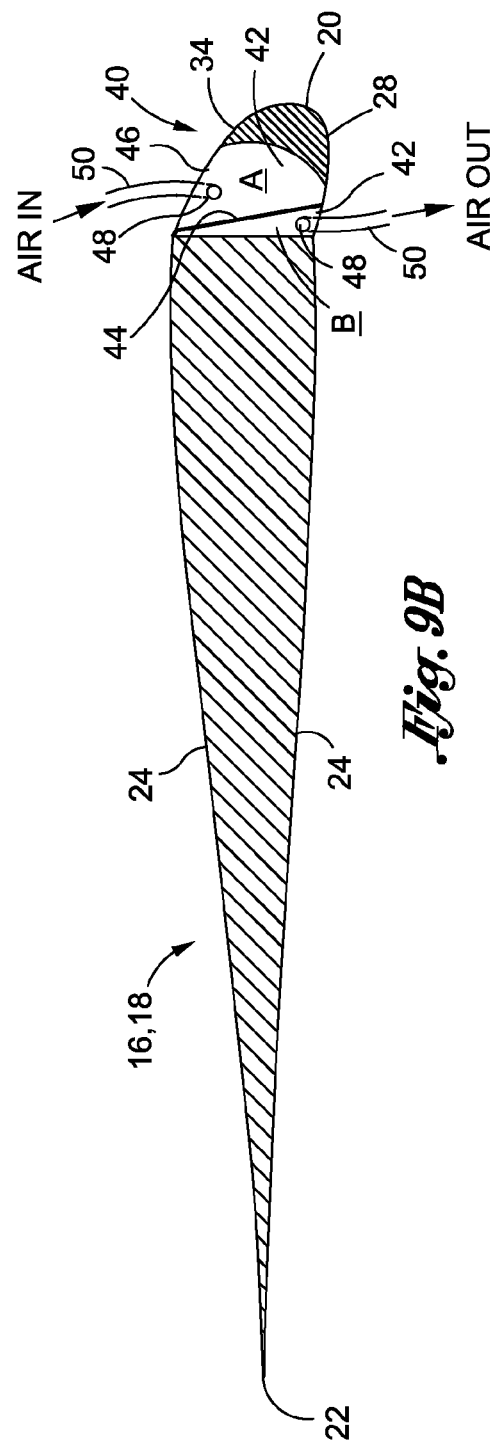

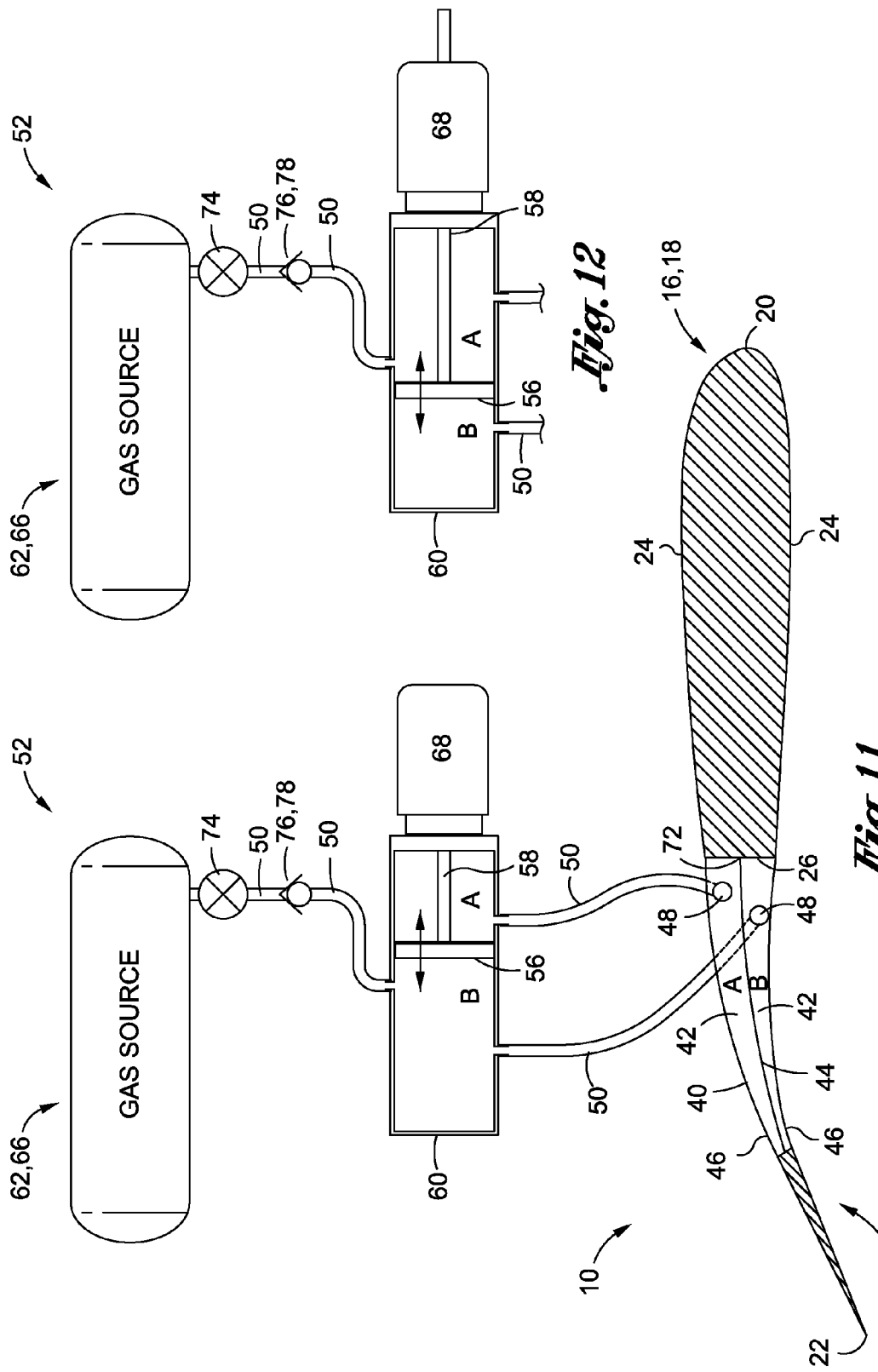

PNEUMATIC CONTROL SYSTEM FOR AERODYNAMIC SURFACES

CROSS-REFERENCE TO RELATED APPLICATIONS

This application is a divisional of application Ser. No. 12/042,443, filed Mar. 5, 2008, issued as U.S. Pat. No. 8,042,772.

STATEMENT RE: FEDERALLY SPONSORED RESEARCH/DEVELOPMENT (Not Applicable)

FIELD

The present invention relates generally to aircraft control surfaces and, more particularly, to a flight control system for pneumatically actuating a control surface of an aircraft or other vehicle.

BACKGROUND

High altitude and long endurance aircraft such as certain unmanned air vehicles (UAV's) may require wings having a long span and a high aspect ratio. Such UAV's may be configured to operate in a loitering capacity at relatively high altitudes (e.g., 50,000 to 80,000 feet) for prolonged periods of time to provide coverage of a specific geographic area. The coverage may include intelligence gathering, surveillance and reconnaissance operations wherein information may be gathered by the UAV and transmitted to ground units or other air units.

Although UAV's may be ground-launched from a runway in the conventional manner for aircraft, in some applications it is desirable to deploy the UAV as a payload of another vehicle. For example, in applications wherein the geographic area where surveillance is desired is far away such as overseas, it may be desirable to transport the UAV to a chosen location such as via an intercontinental ballistic missile (ICBM) or within the payload bay of a larger aircraft such as a long-range bomber or airlifter. Upon reaching the desired location, the UAV may be separated from the ICBM or airdropped from the larger aircraft.

In order to permit packaging of the UAV into the small confines of an ICBM or into an aircraft for aerial drop, it is necessary to stow the relatively large wings and control surfaces into very small volumes. One preferred option for stowing the wings is to configure the wings to be compactable in the payload bay of the missile or larger aircraft such that the wings can be inflated following deployment of the UAV. Furthermore, for aircraft designed to operate in hostile airspace, it is also desirable to minimize the radar visibility or signature of the loitering UAV to increase its survivability. One method for minimizing radar visibility in aircraft is to use materials that are non-reflective to radar such as certain non-metallic materials.

Fortunately, most materials used in the construction of inflatable wings are non-metallic such that the wings themselves are typically radar transparent. However, while the wing structure may be radar transparent, current mechanisms for actuating the control surfaces of the wings such as ailerons, flaps and leading edge devices require the use of mechanisms and/or materials that may not be radar transparent. Even if such current mechanisms are inherently radar transparent, they may possess certain drawbacks and deficiencies that detract from their overall utility.

For example, one option for minimizing the radar transparency of control surfaces is to eliminate the control surfaces altogether. However, because most aircraft require some type of mechanism for controlling the aircraft flight attitude, it is necessary to relocate the control mechanism to the propulsion system. Unfortunately, arranging the propulsion system to provide the aircraft with directional flight control capability may necessitate the use of independently controllable throttles on at least two separate propulsion units.

Furthermore, providing directional control via the propulsion units requires the use of thrust-vectoring devices integrated within the propulsion units. Although such propulsion systems are available, they are also necessarily complex, costly, bulky and heavy. A further drawback associated with the use of the propulsion system as the source of directional control is that a loss of power in the propulsion system not only results in a loss of propulsive force to the aircraft, but also a loss in directional control of the aircraft.

Another option for actuating the control surfaces of an aircraft is through the use of electromechanical actuators. Such electromechanical actuators may be mounted in the wing and may be used to manipulate the flight control surfaces (e.g., ailerons, flaps, etc.) in order to control flight direction and attitude. Unfortunately, because most electromechanical actuators are constructed of metallic materials, they typically exhibit high radar reflectivity. Furthermore, many electromechanical actuators include electric motors constructed with ferrous materials that also exhibit high radar reflectivity. Even further, power is typically provided to the electric motors through the use of metallic wiring extending through the aircraft and which act as radar antennae when extending through the wings to the electromechanical actuators.

A further option for actuating the control surfaces of an aircraft include the use of piezoelectrics wherein piezoelectric strips are mounted on and/or under the surfaces of the inflatable wings such as near the trailing edge. A positive or negative voltage is applied to the piezoelectric strips to cause the strips to expand or contract and therefore curve upwardly or downwardly. If the strips are mounted on the wing near the trailing edge, the trailing edge is also caused to curve upwardly or downwardly such that the portion of the trailing edge may function as an aileron or flap. Unfortunately, the piezoelectric strips operate via dielectric (i.e., voltage) potential which is the very mechanism by which radar sees a surface and therefore rendering such piezoelectric strips unsuitable for use in aircraft requiring radar transparency.

An even further option for actuating control surfaces includes wing warping techniques such as that which was employed by the Wright Brothers for roll control of their experimental aircraft. Wing warping is facilitated through the use of a system of cables and pulleys for twisting the trailing edges of the wings. Unfortunately, the use of wing warping on certain aircraft may result in certain disadvantages such as aerodynamic drag due to exposed cables. Although modern cables are available in radar transparent materials, the exposed cables impose a significant aerodynamic drag penalty which increases with the increasing speed of the aircraft.

As can be seen, there exists a need in the art for a system and method for actuating a control surface that has low radar visibility or is radar transparent. Furthermore, there exists a need in the art for a system and method for actuating a control surface that is predictable and which does not impose excessive aerodynamic drag penalties on the aircraft. Additionally, there exists a need in the art for a system and method for actuating a control surface that is of simple construction, light weight and low cost.

BRIEF SUMMARY

The present invention specifically addresses the above-described needs associated with control systems having low radar visibility by providing a pneumatic control system for a flight control surface that may be mounted on an airfoil such as on an aircraft wing. The technical effects of the invention include the low radar visibility of the control system as an improvement over conventional control surface actuation systems which are radar visible and/or which are complex and/or which impose weight or aerodynamic drag penalties on the aircraft.

The flight control system comprises at least one control surface, a chamber connecting the control surface to the airfoil, and a pneumatic mechanism for actuating the chamber. The chamber may be formed with one and, more preferably, a pair of cells that may be separated from one another by at least one membrane that is preferably of constant length.

The pneumatic mechanism is fluidly connected to the cells and is configured to effectuate or cause a volume change or differential in the cells in order to actuate or move the control surface. Such volume differential occurs as a result of the pressurization/inflation of one cell and/or the de-pressurization/deflation of the remaining cell in order to deflect the control surface upwardly or downwardly. In this manner, the pneumatic mechanism is configured to dynamically inflate and/or deflate the pair of cells in order to differentially add and subtract length from stretchable outer surfaces that define the cells.

The membrane may preferably comprise a unitary structure or layer. However, the membrane may be provided in alternative constructions, shapes, sizes and configurations including, but not limited to, multi-layer arrangements or arrangements comprising multiple components. In addition, the chamber may be configured such that the cells are disposed in either contacting or non-contacting relation to one another. The membrane may be configured to remain at a substantially constant length between the airfoil (e.g., wing) and the control surface and is preferably configured to be non-stretchable. The membrane may be flexible in order to facilitate upward and downward actuation of the control surface during inflation and deflation of the cells.

The cells may be stacked atop one another although other arrangements are contemplated. The outer surfaces of the cells may be arranged so as to provide a continuation of the curvature of mold lines that define the airfoil and, in this regard, the outer surfaces of the cells are preferably substantially flush with the mold lines and with the control surface. The outer surfaces of the cells are preferably fabricated of stretchable material in order to facilitate inflation and deflation of the cells while minimizing pillowing.

The control surface may be configured as a trailing edge device or a leading edge device and may further be provided in a fixed or rigid configuration (e.g., a composite solid), a semi-rigid configuration (e.g., flexible foam) or in an inflatable configuration or any combination thereof. The control surface and airfoil may be provided in a wide variety of alternative configurations including, but not limited to, a flap or elevon mounted on the trailing edge. The control surface may also be mounted on a leading edge in a variety of configurations including, but not limited to, flaps, spoilers, spliterons, drooping leading edge devices and other configurations. The airfoil may be provided in a variety of configurations including, but not limited to, a wing, tail surface or tail section, vertical stabilizer, horizontal stabilizer, stabiliator, elevator, ruddervator, and flaperon.

In one embodiment, the pneumatic mechanism may be configured as a free air piston having a pair of conduits extending from opposing sides of the free air piston to ports on the cells. The conduit material is preferably radar transparent or a low visibility material such as vinyl tubing or other suitable material that facilitates deployment of the wings during inflation. The pneumatic mechanism may include a fill system to account for pressure differential that may occur with changes in the ambient pressure as may occur with altitude changes. The fill system may comprise a pressurized gas source such as a pressure bottle or an on-board compressor or gas generator.

The free air piston may be comprised of a pneumatic piston slidably contained within a cylinder or other suitable pressure vessel for containing a constant volume of pressurized gas. An actuator may have a shaft which extends into the cylinder to attach to the piston so that the actuator can translate or move the piston. Conduits extending from each side of the cylinder may be fluidly connected to the ports of each of the cells. Advantageously, the free air piston configuration enables a higher degree of control surface responsiveness as compared to an open system. Due to it closed system configuration, the free air piston allows for deflection of the control surfaces within a bandwidth and deflection capability that is similar to conventional aircraft actuation systems in order to provide the level of responsiveness that is required for directional control of the aircraft.

The flight control system may comprise at least one position sensor to monitor and/or detect the position of the control surface or piston for feedback to the actuator. Position sensors may likewise be included with the pneumatic mechanism to detect the position of the piston to facilitate regulation of the actuator. The position sensors for the control surfaces may comprise mechanical deflection sensors and/or pressure taps configured to provide pressure measurements inside the pneumatic piston or inside the cells.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

The features of the present invention will become more apparent upon reference to the drawings wherein like numerals refer to like parts there throughout and in which:

FIG. 4 is an illustration of the control surface actuated or deflected into an upward orientation and further illustrating a piston of the pneumatic mechanism being biased to one side of a cylinder;

FIG. 5 is a sectional view taken along lines 5-5 of FIG. 4 and illustrating upward deflection of the control surface with the lower cell being in an inflated state and/or the upper cell in a deflated state;

FIG. 6 is an illustration of the control surface actuated into a downward orientation and further illustrating the piston of the pneumatic mechanism being biased to an opposite side of the cylinder relative to that which is shown in FIG. 4;

FIG. 7 is a sectional view taken along lines 7-7 of FIG. 6 and illustrating downward deflection of the control surface with the upper cell being in an inflated state and/or the lower cell in a deflated state;

FIG. 8A is a sectional view of an embodiment wherein the control surface is configured in a drooping leading edge device and which is shown in a non-actuated position;

FIG. 8B is a sectional view of the drooping leading edge device of FIG. 8A in an actuated position;

FIG. 9A is a sectional view of a further embodiment of the drooping leading edge device in a non-actuated position;

FIG. 9B is a sectional view of the further embodiment of the drooping leading edge device of FIG. 9A in an actuated position;

FIG. 11 is a schematic illustration of a further embodiment of the pneumatic mechanism and illustrating the piston positioned on a right side of the cylinder; and FIG. 12 is a schematic illustration of the pneumatic mechanism of FIG. 11 wherein the piston is positioned on a left side of the cylinder.

DETAILED DESCRIPTION

Figure 1:
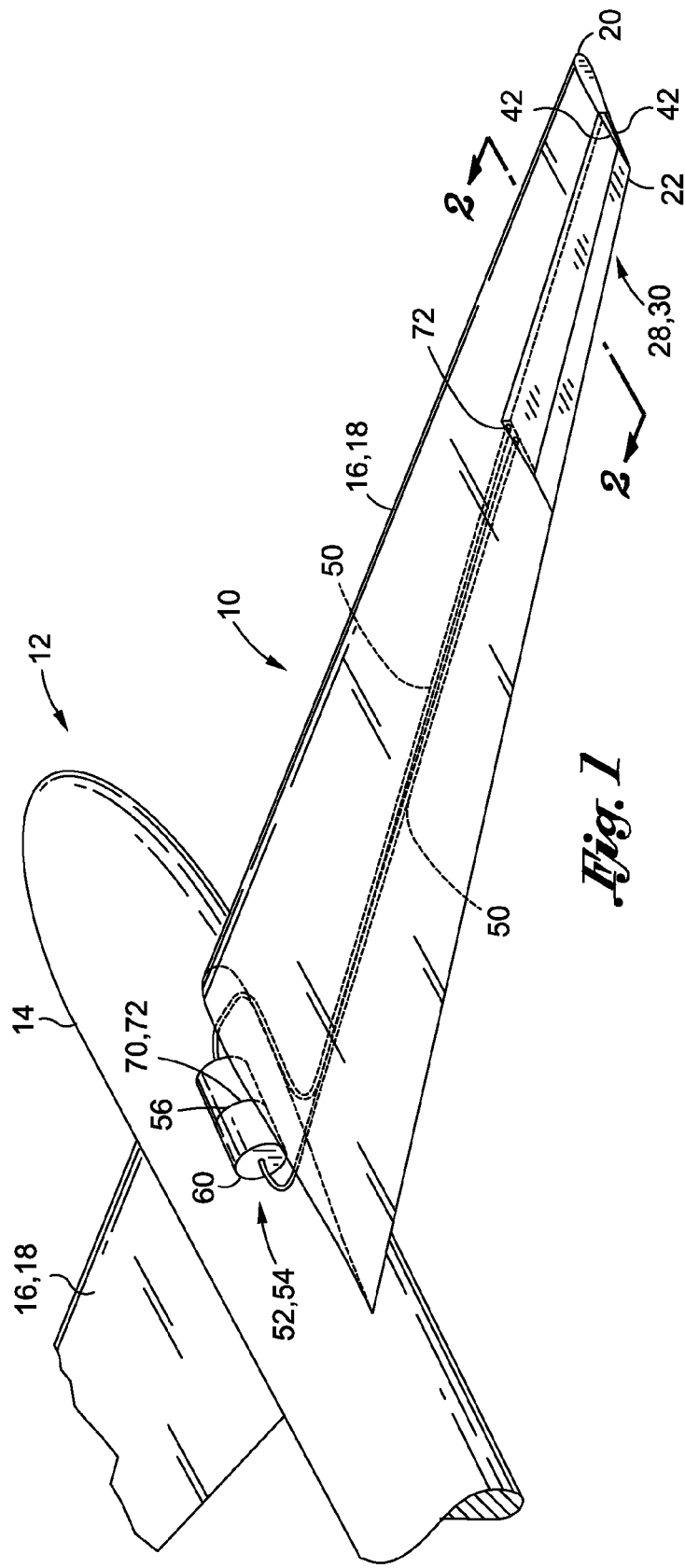
FIG. 1 is an illustration of an aircraft having a pneumatic control system for a flight control surface mounted on a wing.

Referring now to the drawings wherein the showings are for purposes of illustrating preferred and various embodiments of the invention only and not for purposes of limiting the same, FIG. 1 is an illustration of an aircraft 12 having one embodiment of a pneumatic control system 10 for a flight control surface 28 mounted on an airfoil 16 such as an aircraft wing 18. In FIG. 1, the control surface 28 is shown configured as an aileron 30 mounted adjacent to a trailing edge 22 of the wing 18. However the control surface 28 and airfoil 16 to which it is attached may be provided in a wide variety of alternative configurations.

For example, the control surface 28 may be configured as a flap 34 or elevon mounted on the trailing edge 22. In another embodiment, the control surface 28 may be configured to be mounted on a leading edge 20 of the wing 18 in a variety of configurations including, but not limited to, flaps, spoilers, drooping leading edge devices and various alternative aerodynamic devices. The airfoil 16 may also be provided in a variety of alternative configurations including, but not limited to, a wing, tail surface or tail section, vertical stabilizer, horizontal stabilizer, stabilator, elevator, ruddervator, flaperon as well as various canard configurations and trim devices.

For purposes of the following 18 discussion, the control surface 28 and airfoil 16 to which it is mounted are provided as the wing 18 and aileron 30 shown in FIGS. 1-12 although the various operating principles of the control system 10 described herein are applicable to any number of a variety of control surfaces 28 and airfoils 16 in addition to those mentioned above. Furthermore, the control system 10 is not limited to aircraft but may be applicable to any vehicle wherein pneumatic actuation of control surfaces 28 is desired.

Referring to FIG. 1, the aircraft 12 may optionally include a fuselage 14 although it is contemplated that the embodiments described herein are applicable to tailless aircraft or flying wing configurations which lack a fuselage 14 as conventionally known. Furthermore, the embodiments described herein are applicable to a wide variety of aircraft and are not limited to inflatable aircraft or unmanned air vehicles (UAV).

In FIG. 1, the flight control system 10 comprises at least one control surface 28, a chamber 40 connecting the control surface 28 to the wing 18 (i.e., airfoil 16), and a pneumatic mechanism 52 for actuating the chamber 40 via differential pressure pneumatics. The chamber 40 may extend along at least a portion of the length of the control surface 28. In this regard, the chamber 40 may comprise chamber segments spaced along the control surface 28 or the chamber 40 may extend along the entire length of the control surface 28.

The shape of the chamber 40 may be dynamically altered by inflating and/or deflating at least one cell 42 and, more preferably, a pair of cells 42 in order to differentially add and subtract length from stretchable outer surfaces 46 that define the cells 42. In one embodiment, the cells 42 may be separated from one another by a membrane 44 that is preferably of constant length.

The pneumatic mechanism 52 is fluidly connected to the cells 42 and is configured to effectuate or cause a pressure differential or volume change in the cells 42 in order to actuate or move the control surface 28. Such differential pressure or volume change occurs during inflation of one cell 42 and/or deflation of the remaining cell 42 in order to cause the control surface 28 to deflect upwardly or downwardly, depending upon which cell 42 is inflated, as will be described in greater detail below.

Figure 2:
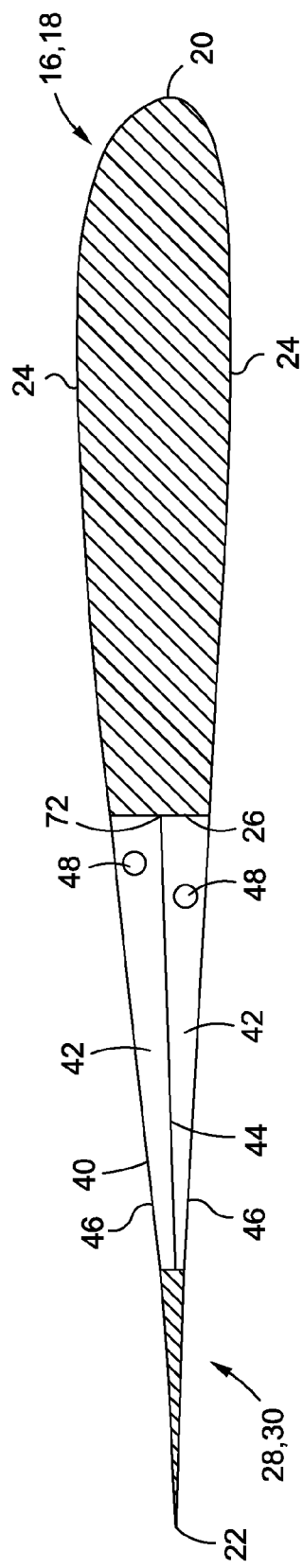
FIG. 2 is a sectional view taken along lines 2-2 of FIG. 1 and illustrating a chamber connecting the control surface to the wing wherein the chamber includes a pair of cells separated by a membrane.

Referring to FIG. 2, the membrane 44 can be seen as extending from a wall 26 of the wing 18 and back toward the control surface 28. The cells 42 that make up the chamber 40 may be fluidly separated from one another by the membrane 44. Although the membrane 44 is generally shown as comprising a single unitary structure or layer, it should be noted that the membrane 44 may comprise alternative shapes, sizes and configurations including, but not limited to, multi-layer arrangements or arrangements comprising multiple components. In addition, it is contemplated that the cells 42 may be configured such that the membrane 44 does not function as a common wall for the cells 42. In this regard, the chamber 40 may be configured such that the cells 42 are in non-contacting relation to one another.

Furthermore, although the configuration in FIG. 1 illustrates the membrane 44 as being disposed substantially equidistantly between outer surfaces 46 of the cells 42, the membrane 44 may be attached to the wing 18 or the control surface 28 at any position. For example, the membrane 44 may be biased toward a lower wing surface and toward a lower side of the control surface 28. Regardless of its orientation, the membrane 44 is preferably configured to remain at a substantially constant length between the airfoil 16 (i.e., wing wall 26) and control surface 28. In addition the membrane 44 is preferably configured to be non-stretchable to facilitate the constant length characteristic. Furthermore, the membrane 44 is preferably configured to be flexible in order to facilitate upward and downward actuation of the control surface 28 during inflation and deflation of the cells 42.

Referring still to FIG. 2, the cells 42 in the illustrated exemplary embodiment are disposed or stacked atop one another although other arrangements are contemplated. Furthermore, the outer surfaces 46 of the cells 42 in FIG. 2 are illustrated as a continuation of the curvature of mold lines 24 of the wing 18 (i.e., airfoil 16) in order to maintain the aerodynamics of the wing 18. In this regard, the outer surfaces 46 of the cells 42 are preferably substantially flush with the mold lines 24 at least at the junction of the outer surfaces 46 with the mold lines 24.

Likewise, the outer surfaces 46 of the cells 42 are preferably substantially flush with the mold lines 24 of the control surface 28 and preferably at a location of the junction therebetween in order to maintain continuity of the mold lines 24 and to preserve the aerodynamics of the wing 18. The outer surface 46 of at least one of the cells 42 is preferably configured to be fabricated of stretchable material such as structural fabric in order to facilitate inflation and deflation of the cell 42 while minimizing pillowing 18 during upward and downward deflection of the control surface 28. Preferably, the material for the outer surfaces 46 of the cells 42 also possesses a suitable strength-to-weight ratio which may be dictated in part by the inflation pressure of the cells 42. In addition, the material for the outer surfaces 46 of the cells 42 is also preferably radar transparent although it is contemplated that non-radar transparent material may be used.

The control surface 28 in FIG. 2 is shown as a trailing edge 22 device which may be provided in a rigid configuration, a semi-rigid configuration or in an inflatable configuration or any combination thereof. For the rigid configuration, the control surface 28 may be constructed as a rigid solid formed of composite and/or non-metallic materials although metallic materials may be employed. For the semi-rigid configuration, the control surface 28 may be constructed of a flexible or elastic material which may include the use of polymeric material such as flexible foam. For the inflatable configuration, the control surface 28 may be configured as a bladder or cell which is attached to the cells 42 of the chamber 40 in the manner shown in FIG. 2. Regarding sizes of the control surface relative to the chamber, it is contemplated that the cells of the chamber may define a width (i.e., along a chordwise direction of the airfoil) that is greater than a width of the trailing edge device as is illustrated in the embodiment shown in FIGS. 1-7 although other relative sizes may be provided.

Figure 3:
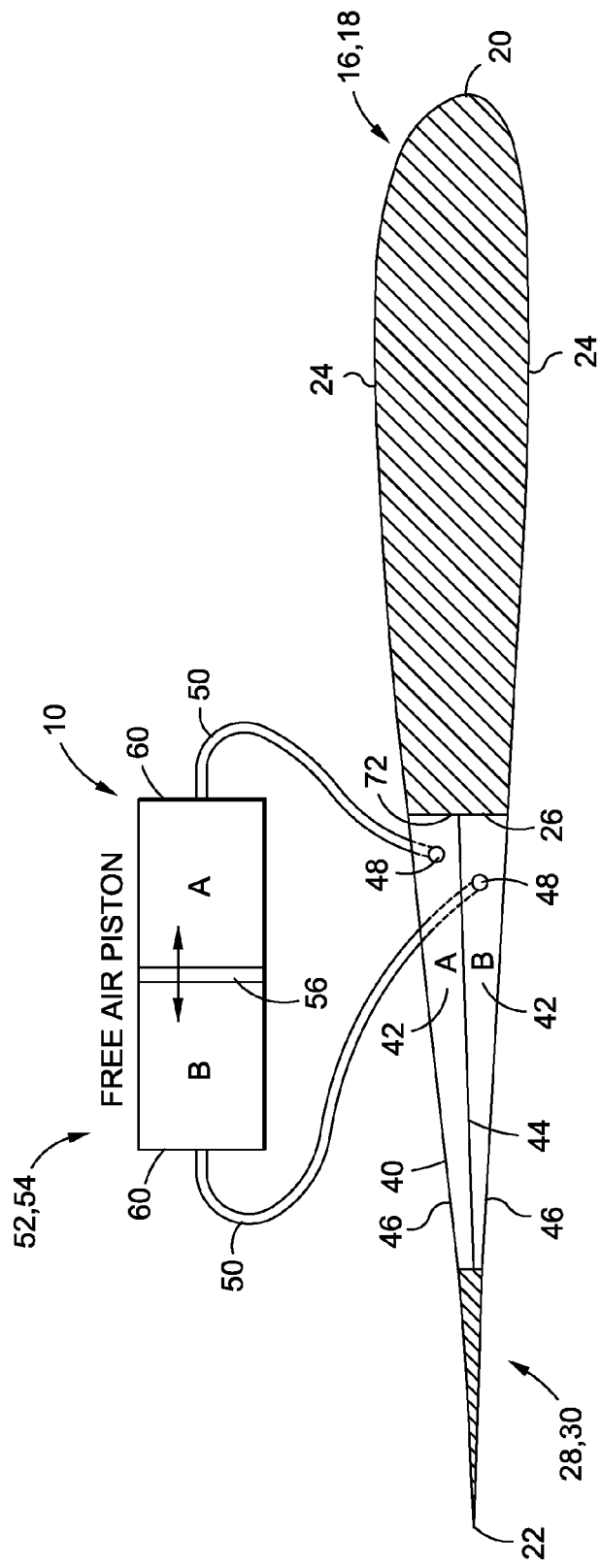
FIG. 3 is a schematic illustration of a pneumatic mechanism fluidly connected to upper and lower cells with the control surface being oriented in a neutral position.

Referring to FIGS. 1-3, the pneumatic mechanism 52 is shown in one embodiment as a free air piston 54 preferably mounted adjacent to or within the fuselage 14 although other locations for mounting the pneumatic mechanism 52 are contemplated. The free air piston 54 has a pair of conduits 50 extending from opposing sides and extending through the wing 18 to a respective one of the cells 42. The conduits 50 are fluidly connected to the cells 42 at ports 48 in order to provide pressurized gas to the cells 42 and/or allow for the release of pressurized gas. The ports 48 are shown located at a forward end on a side of each of the cells 42 but may be located in any suitable position and are further not limited to being located on the sides or ends of the cells 42.

The conduit 50 material is preferably, but optionally, a flexible tubing of polymeric material that is also preferably radar transparent or a low radar visibility material. For example, vinyl tubing may be a suitable material from which the conduit 50 may be fabricated although any suitable material may be used. Preferably the conduit 50 is flexible in order to facilitate stowage of the wings in the uninflated condition as well as to facilitate deployment of the wings during inflation thereof.

Referring now to FIG. 3, shown is the pneumatic mechanism 52 in the free air piston 54 embodiment which advantageously provides an essentially closed air system in order to facilitate relatively rapid deflection rates of the control surface 28. In this regard, the closed system provided by the free air piston 54 configuration enables higher responsiveness as compared to an open system. The free air piston 54 may be comprised of a piston slidably contained within a cylinder 60 or other suitable pressure vessel for containing a constant volume of pressurized gas within the pneumatic mechanism 52.

Figure 10:
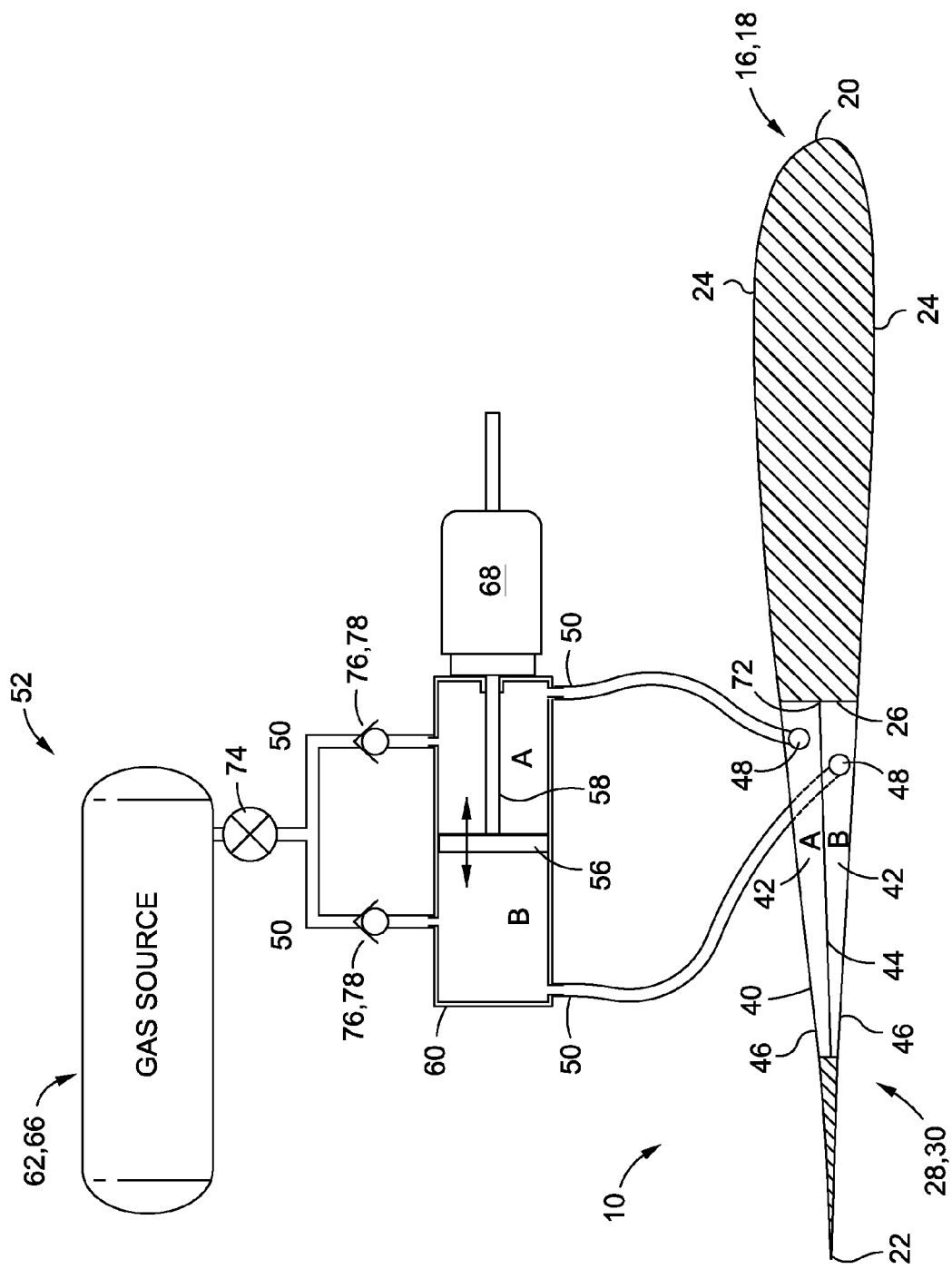
FIG. 10 is a schematic illustration of an embodiment of a pneumatic mechanism configured as a dual blow down fill system.

The piston 56 may be translated by an actuator 68 having a shaft 58 extending into the cylinder 60 and attaching to the piston 56 as shown in FIG. 10. Conduits extending from each side of the cylinder 60 may be fluidly connected to the ports 48 of each of the cells 42 as shown in FIG. 3. The free air piston 54 may preferably be configured to operate the control surfaces 28 within a frequency bandwidth and deflection capability similar to that which is available in conventional aircraft actuation systems. Depending upon roll, pitch and yaw requirements, such responsiveness is desirable for control surfaces 28 such as ailerons 30, rudders, elevators and their related configurations (i.e., ruddervators, elevons, etc.) for directional control of the aircraft 12.

Optionally, the pneumatic mechanism 52 may include a fill system to account for pressure differential between the internal pressure in the free air piston 54 as the ambient pressure changes with altitude or with other atmospheric conditions. The fill system may include a pressurized gas source 62 such as a pressure bottle 66 similar to that which is shown in FIGS. 10-12 and which is described in detail below. Alternatively, the fill system may comprise a compressor such as an onboard compressor of the aircraft 12. Both sides of the free air piston 54 or, alternatively, only one side of the free air piston 54 may be tapped. For example, FIG. 10 illustrates the pressurized gas source being tapped into two locations of cylinder 60 whereas FIGS. 11 and 12 illustrate the pressurized gas source 62 being tapped into only one location on the cylinder 60.

FIG. 10 illustrates a dual blow down system comprising a pressurized gas source 62 fluidly connected to a cylinder 60. As can be seen, a regulator 74 may be installed in the conduit 50 connecting the pressurized gas source 62 to the cylinder 60. Each of the pair of conduits 50 extending between the regulator 74 and the cylinder 60 may include a check valve 76. The check valves 76 prevent gas flow between each side of the cylinder 60. The piston 56 is moved within the cylinder 60 by an actuator 68 that may be connected to the piston 56 by the shaft 58. The piston 56 is translated in response to control signals representative of a desired amount of deflection of the control surface 28.

In FIG. 10, the cylinder 60 portions A and B are fluidly connected to respective cells 42 (A) and (B) of the control surface 28 such that movement of the piston 56 causes differential pressure change in the cells 42 resulting in inflation and deflation of the cells and causing deflection of the control surface 28. More particularly, in one embodiment, movement of the piston 56 toward the right inflates cell 42 (A) while simultaneously causing cell 42 (B) to deflate such that the control surface 28 is deflected downwardly. Movement of the piston 56 toward the left inflates cell 42 (B) while causing cell 42 (A) to deflate such that the control surface 28 is deflected upwardly. In FIG. 10, the piston 56 is preferably in the neutral position when the cylinder 60 is pressurized by the pressurized gas source 62.

A single blow down system would be similar to that which is illustrated in FIG. 3 with the addition of the pressurized gas source 62 fluidly connected to the cylinder 60 such that each portion of the cylinder 60 may receive pressurized gas from the pressurized gas source 62 depending upon the location of the piston 56. As mentioned above, the piston 56 is driven and controlled by the actuator 68. A check valve 76 may be included to prevent gas flow out of the cylinder 60 toward the pressurized gas source 62.

Solenoids 78 may also be used to prevent airflow toward the pressurized gas source 62 but may also be configured to regulate air flow in both directions through the conduit 50 between the pressurized gas source 62 and the cylinder 60.

The regulator 74 may also be included to monitor and allow adjustment of the pressure that is provided by the pressurized gas source 62 which, as indicated above, may be provided as a pressure bottle 66, a compressor and/or a gas generator or any other suitable pressurized gas source.

Referring to FIGS. 11-12, shown is the pneumatic mechanism 52 in an alternative embodiment wherein a single conduit 50 connects the pressurized gas source 62 to the cylinder 60. As in the arrangement of FIG. 10, the piston 56 is driven and controlled by the actuator 68. The check valve 76 may be installed in conduit 50 to prevent gas flow from the cylinder 60 toward the pressurized gas source 62. The piston 56 divides the cylinder 60 into portions A and B and regulates the apportionment of pressurized gas flow to cells 42 (A) and (B) of the chamber 40 at the control surface 28 similar to that which was described above for FIG. 10.

For example, FIG. 11 illustrates positioning of the piston 56 toward the right which causes inflation of cell 42 (A) while simultaneously causing cell 42 (B) to deflate such that the control surface 28 is deflected downwardly as shown. FIG. 12 illustrates positioning of the piston 56 toward the left in order to inflate cell 42 (B) while causing cell 42 (A) to deflate such that the control surface 28 is deflected upwardly.

In an alternative configuration, the pneumatic system may also be configured as an open loop system (not shown) wherein a pump or a blow down gas supply provides pressure differential directly to the cells 42 in order to actuate the control surface 28. Such open loop system may have a relatively slower response rate than that which is available with a closed loop system. Therefore, open loop systems may be more suitable for actuation of control surfaces 28 that are designed to change the camber, profile or other geometry of the airfoil 16 such as the wing 18. For example, flaps 34 or drooping leading edges 32 may be effectively actuated by an open loop system pneumatic mechanism 52 in order to reduce stall speed or achieve other aerodynamic effects. However, it is contemplated that any of the open and closed loop systems may be used for actuating any control surface 28 configuration described herein or alternative device 28 configurations.

As shown in FIGS. 1-7, the flight control system 10 may further comprise at least one position sensor 72 to monitor and/or detect the position of the control surface 28 for feedback to the actuator 68 which preferably, but optionally, operates as a closed loop control system 70 to minimize errors. The position sensors 72 may comprise any variety of configurations including mechanical deflection sensors or other devices. For example, position sensors may be provided as pressure taps configured to measure pressure within the cells 42 or within the cylinder 60. Alternatively or in addition, the pressure sensors may be mounted on the surface of the wing 18 to detect changes in pressure along the surface in response to deflections of the control surfaces 28.

The operation of the control system 10 will now be described with reference to FIGS. 1-7. Referring to FIG. 1, shown is the piston 56 in a center or neutral position of the cylinder 60 with the control surface 28 in FIG. 2 likewise being oriented in a neutral or non-deflected position. In this state, the pressure in cells 42 (A and B) as shown in FIG. 3 may be evenly distributed such that neither cell 42 (i.e., neither A nor B) is inflated to a pressure that is greater than its static pressure level. FIGS. 4 and 5 illustrate the piston 56 as being biased toward portion B of the cylinder 60 causing inflation of cell 42 (A) and/or deflation of cell 42 (B) of the chamber 40 illustrated in FIG. 5.

The inflation of cell 42 (B) causes an increase in the length of the outer surface 46 of cell 42 (B) which causes the trailing edge 22 to deflect upwardly as shown. The membrane 44 is preferably maintained at a constant length and may be flexible to facilitate upward deflection of the trailing edge 22. Referring to FIGS. 6-7, shown is the piston 56 being biased toward portion A of the cylinder 60 causing inflation of cell 42 (B) and/or deflation of cell 42 (A) of the chamber 40 illustrated in FIG. 7. The inflation of cell 42 (A) causes an increase in the length of the outer surface 46 of cell 42 (A) which causes the trailing edge 22 to deflect downwardly as shown. Similar effects are provided to other control surface 28 configurations such as leading edge flaps 34 and drooping leading edges 32.

For example, FIGS. 8A and 8B illustrate a configuration of the control surface 28 implemented in a drooping leading edge 32 device. The drooping leading edge 32 device may include a fixed portion which may be provided in a rigid configuration (e.g., a composite solid), a semi-rigid configuration (e.g., flexible foam) or in an inflatable configuration or any combination thereof similar to the rigid trailing edge configurations described above. The drooping leading edge 32 device is shown as having the fixed portion disposed on the leading edge 20 of the airfoil 16. As can be seen in FIGS. 8A and 8B, the membrane 44 may be formed in a general wedge-shaped configuration wherein the membrane 44 may extend generally diagonally upwardly from a lower side of the airfoil 16 and diagonally back downwardly wherein the membrane 44 re-attaches to the lower side of the fixed portion. In this regard, the membrane 44 may form the pair of cells 42 (A) and (B) as shown. In addition to the fixed portion and the membranes 44 which separates cells 42 (A) from (B), the drooping leading edge 32 device may optionally include one or more permeable webs 38 that subdivide cell 42 (A). Each of the permeable webs 38 is preferably substantially non-stretchable to maintain the position of the membranes 44 that define cells 42 (A) and (B). Although two of the permeable webs 38 are shown in FIGS. 8A and 8B, any number may be provided.

In FIGS. 8A and 8B, the pneumatic mechanism 52 provides pressure differential between cells 42 (A) and (B) in a manner similar to that which was described above with reference to FIGS. 1-7. The drooping leading edge 32 device of FIG. 8A is shown in a static or non-actuated position. FIG. 8B illustrates the actuation of the drooping leading edge 32 device by inflating cell 42 (A) with cell 42 (B) being simultaneously deflated. The permeable webs 38 allow pressurized gas to pass freely thereacross while maintaining their length during the inflation of cell 42 (A). The outer surface 46 of cell 42 (A) expands upon inflation while cell 42 (B) at least partially collapses to cause downward movement of the drooping leading edge 32 device. Deflation/inflation of cells 42 A/B back to their static or neutral pressure causes a return of the leading edge device to its non-deflected position as is illustrated in FIG. 8A.

FIGS. 9A and 9B illustrate an alternative configuration of a drooping leading edge 32 wherein the membrane 44 extends from an upper side of the wing 18 toward a fixed portion of the leading edge 20 of the airfoil 16. The rigid portion of the leading edge 20 is similar to that described above with reference to FIGS. 8A and 8B. Inflation of cell 42 (A) cause the outer surface 46 to expand or increase in length with simultaneous deflation of cell 42 (B) causing the leading edge 20 to drop. As is known in the art, actuation of a drooping leading edge can cause an increase in the airfoil 16 camber which may enhance the lift capabilities of the airfoil 16 (e.g., wing, elevator).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method for controlling a control surface of an airfoil comprising:
   providing a first pressure to a first cell;
   providing a second pressure to a second cell;
   changing one of the first pressure, the second pressure, and the first pressure and the second pressure such that the second pressure is less than the first pressure; and
   deflecting the control surface in a direction toward the second cell having a pressure lower than the first cell, the first cell and the second cell being separated by a substantially nonstretchable membrane positioned between the first cell and the second cell and extending from a wall of a wing to the control surface, and at least one of the first cell and the second cell connected to the control surface.

2. The method of claim 1, wherein the first cell and the second cell are the only cells positioned between the wall of the wing and the control surface, and further comprising the step of increasing the first pressure to the first cell and decreasing the second pressure to the second cell thereby deflecting the control surface toward the second cell and away from the first cell.

3. The method of claim 1 further comprising changing the pressure provided by a pneumatic system in fluid communication with the first cell and the second cell.

4. The method of claim 3 wherein the pneumatic system comprises at least one of a pump or a compressor.

5. The method of claim 3 wherein the pneumatic system comprises a piston and cylinder.

6. The method of claim 1, wherein the control surface is substantially rigid, the first cell and the second cell comprise a chamber, and the chamber connects the control surface to the airfoil, and wherein at least one of the first cell and the second cell comprises a stretchable outer surface, and wherein the membrane is substantially non-stretchable.

7. The method of claim 1 wherein the first cell and the second cell each comprise a stretchable outer surface, and wherein a profile of the first cell and the second cell substantially matches a mold line of the airfoil.

8. The method of claim 1 wherein the control surface comprises one of a leading edge and a trailing edge.

9. The method of claim 1 wherein providing the first pressure to the first cell and providing the second pressure to the second cell controls a positioning of the control surface configured as one of an aileron, slat, flap, flaperon, elevon, spliteron, and drooping leading edge.

10. The method of claim 1 wherein the first cell and the second cell comprise a chamber positioned between the control surface and the airfoil.

11. The method of claim 10 wherein the airfoil comprises one of a wing, tail surface, vertical stabilizer, rudder, horizontal stabilizer, elevator, ruddervator, stabiliator, and canard.

12. A method for controlling an attitude of a control surface of an aircraft comprising:
   providing a first pressure from a free air piston to a first cell;
   providing a second pressure to a second cell;
   changing one of the first pressure, the second pressure, and the first pressure and the second pressure such that the second pressure is less than the first pressure; and
   deflecting the control surface in a direction toward the second cell having a pressure lower than the first cell, the first cell and the second cell being separated by a substantially nonstretchable membrane positioned between the first cell and the second cell and extending from a wall of a wing to the control surface, and at least one of the first cell and the second cell connected to the control surface.

13. The method of claim 12 wherein both the first cell and the second cell are connected to the control surface, the control surface being substantially rigid, the first cell is positioned above the second cell, the first cell and the second cell are the only cells positioned between the wall of the wing and the control surface, and further comprising inflating the first cell and deflating the second cell so as to lower the control surface.

14. The method of claim 12 wherein both the first cell and the second cell are connected to the control surface, the control surface being substantially rigid, the first cell is positioned above the second cell, and further comprising deflating the first cell and inflating the second cell so as to raise the control surface.

15. The method of claim 12 further comprising the step of receiving position information from a position sensor regarding the attitude of the control surface.

16. The method of claim 15 further comprising the step of changing the pressure in one of the first cell and the second cell based on the position information of the control surface.

17. The method of claim 12 further comprising providing fluid through a conduit from a pressure source to one of the first cell and the second cell.

18. The method of claim 17 further comprising controlling a fluid flow to one of the first cell and the second cell with a solenoid.

19. The method of claim 12 wherein the first cell and the second cell comprise materials that are substantially radar transparent.

20. The method of claim 12 further comprising adjusting the first pressure in the first cell and the second pressure in the second cell as ambient pressure changes.

\* \* \* \* \*